Aug. 17, 1965  S. A. McGAVERN, JR  3,200,485
METHOD OF FABRICATING VIBRATION DAMPER
Filed March 11, 1963
Fig. 1.
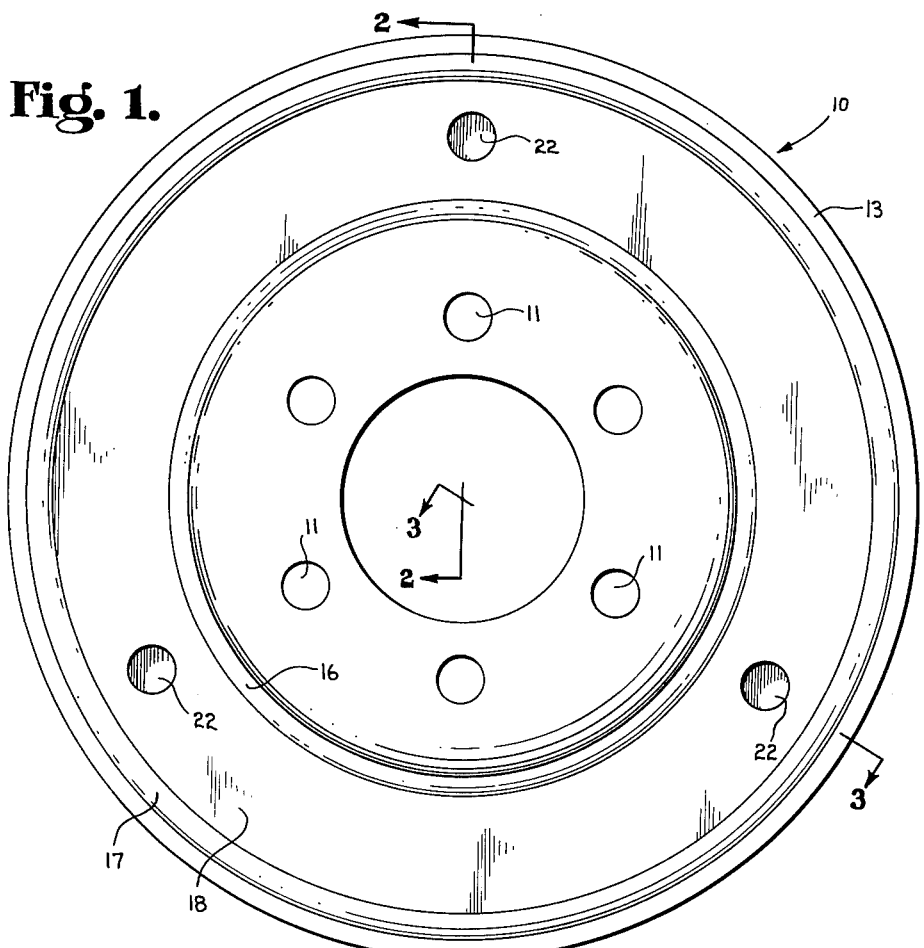
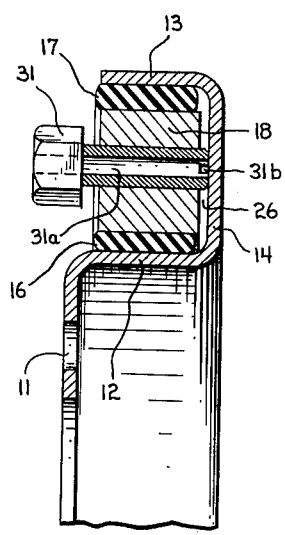
Fig. 2.
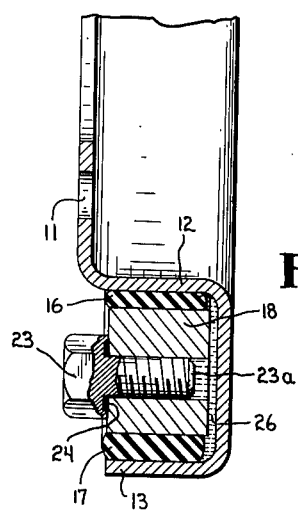
Fig. 3.
INVENTOR.
SANFORD A. McGAVERN, JR.
BY
Lakewood, Woodard, Smith & Weikart
Attorneys

United States Patent Office 3,200,485
Patented Aug. 17, 1965

3,200,485
METHOD OF FABRICATING VIBRATION DAMPER
Sanford A. McGavern, Jr., Indianapolis, Ind., assignor to Schwitzer Corporation, Indianapolis, Ind., a corporation of Indiana
Filed Mar. 11, 1963, Ser. No. 264,213
3 Claims. (Cl. 29—421)

This invention relates generally to torsional vibration dampers of the type mounted on, for example, the crankshaft of an internal combustion engine, and relates in particular to a method of fabricating an encapsulated damper.

Torsional vibration dampers of certain types employ elastic elements which tune the inertia mass component of the assembly to the mass elastic system generating the torsional vibrations, the elastic members converting to thermal energy a portion of the kinetic, vibratory energy. The resistance to shear of a film of viscous fluid is also utilized to absorb a further portion of the vibratory energy. Dampers of the type referred to are disclosed in U.S. Patent 2,939,338. These dampers are generally of somewhat complicated design and difficult to assemble economically.

An object of the present invention is to provide a method for inexpensively and relatively simply fabricating and assembling a torsional vibration damper. A further object of the present invention is to provide a method for assembling a torsional vibration damper of the type utilizing a shear fluid and an elastic component for absorbing vibratory energy in which method the fluid pressure within the damper serving to hold the shear face spacing can be conveniently established at final assembly.

In the method of the present invention, an elastic element, in the form of two rubber rings, is compressed in place between the annular inertia member and the damper casing. The assembly forms a chamber for a viscous shear fluid and the volume of this chamber is determined by spacing the annular inertia member from the radially extending rear wall of the damper casing. This spacing is accomplished by temporarily inserting hollow capscrews having a slotted end through apertures in the inertia member before it is assembled into the casing, the capscrews protruding through the inertia member a predetermined distance. The annular inertia member, with capscrews in place, is then installed into the casing and between the rubber rings until the protruding ends of the capscrews bottom at the rear wall of the casing. The air which must exit from the chamber as the inertia member is moved into place is vented through the capscrew apertures. The capscrews are then removed from the inertia member and a predetermined quantity of shear fluid is introduced into the chamber through the tapped apertures opened by removal of the capscrews. The holes are then plugged by inserting therein solid capscrews which are sealed in place. The length of the capscrews last referred to establishes the volume of the chamber and hence the spacing of the adjacent shear faces of the inertia member and the casing. This spacing determines the magnitude of the fluid shear energy absorbing component of the damper and the establishing of a fluid pressure in the chamber by a predetermined capscrew length or depth of insertion serves to hold the required spacing between the adjacent shear faces of the inertia member and case against any lateral blows or pressures which the assembly might receive in service.

The invention is disclosed in detail in the following description and accompanying drawings in which:

FIG. 1 is a front view of an assembly embodying the present invention with the closure capscrews omitted.

FIG. 2 is a fragmentary sectional view taken generally along the line 2—2 of FIG. 1 and illustrating the apparatus at an intermediate stage in its assembly according to the method of the present invention.

FIG. 3 is a sectional view similar to FIG. 2 but taken along the line 3—3 of FIG. 1 and showing the damper assembly in its finally assembled form.

Referring to the drawings, the structure formed from the method of the present invention includes a generally flat disc or plate 10 having an enlarged central aperture therethrough and provided with a plurality of mounting apertures 11. The apertures 11 serve to adapt the disc to be bolted or otherwise rigidly secured to a hub member or the like which, in turn, may be mounted on a rotatable member such as an internal combustion engine crankshaft subject to torsional vibration. The disc is formed to provide a peripheral, annular cavity open at the front face of the disc and defined by spaced axially extending side walls 12 and 13 joined by a radially extending base wall 14.

Referring particularly to FIG. 3 which illustrates the completed assembly, inserted in the cavity adjacent to the side wall 12 is an elastic element 16 of annular configuration. Adjacent the outer side wall 13, the cavity also contains an outer elastic element 17 having an annular configuration. The elastic elements may be formed of rubber or similar elastomeric material and their cross-sectional thickness may differ, as shown, since the elastic elements are proportioned to give optimum damping effect while the stresses on the elements are held equal.

Interposed between the elastic elements 16 and 17 and sized so as to place these elements in radial compression when in place therebetween, is an annular inertia element 18 having appreciable mass. Spaced about the inertia element are apertures 22 (FIG. 1) which in the completed assembly receive the closure members in the form of capscrews 23. The capscrews 23 may be sealed in place by any suitable means such as by the use of a plastic cement indicated generally at 24 in FIG. 3.

It will be noted that the inertia element 18 is spaced somewhat from the base wall 14 and this space defines a chamber indicated at 26 in FIG. 3. The chamber is filled with a viscous shear fluid such as a silicone oil compound. It will be noted that the tip 23a of the capscrew 23 extends into contact with the fluid in the chamber 26. Thus, the length of the screw 23 or the depth of its insertion into the aperture 22 defines the total volume of chamber 26 and hence the fluid pressure within the chamber which acts against the face of member 18 to maintain its proper spacing from the adjacent face of base wall 14. The closure member in the form of capscrew 23 thus may be utilized, by either predetermining its length or its depth of insertion, to calibrate or establish the final fluid pressure within the chamber 26.

In operation, the damper will function, as is well known in the art, in a fashion such that the elastic members 16 and 17 absorb and convert to thermal energy a portion of the kinetic vibratory energy received from the shaft or other rotating element subject to torsional vibrations. The resistance to shear of the fluid in the chamber 26 is also utilized to absorb a further portion of the vibratory energy. It will be noted that the apparatus described is of relatively simple construction having a minimum of component elements and having, in the form of the closure members 23, a means of finally establishing or defining the shear fluid pressure in the chamber 26.

Referring primarily to FIG. 2, the method of assembling the structure just described will now be pointed out in detail. In carrying out the method of the present invention the apertures 22 in the inertia element 18 have inserted therein modified capscrews 31. These capscrews are inserted in the inertia member prior to its placement in the cavity in the member 10 and they are placed in the apertures 22 so that they extend or protrude a predetermined amount from the side face of the inertia member. The capscrews 31 are modified by having drilled therein an axial aperture 31a which extends through the capscrew head and are further modified by providing their tips with transverse slots as indicated at 31b in FIG. 2.

The inertia member 18, with the modified capscrews 31 in place is now inserted, by any suitable means, within the cavity between the elastic members 16 and 17 which have either previously or simultaneously been inserted into the cavity. It will be understood that the elastic members might also be inserted subsequent to placement of the inertia member 18 in the cavity. With the inertia element in place the elastic members 16 and 17 will be under radial compression. The inertia element 18 is inserted into the cavity until the tips of the capscrews 31 bottom on the inner face of the cavity base wall 14, the amount of extension of the ends of the capscrews 31 beyond the adjacent side face of the inertia element 18 thus defining the volume of the shear fluid chamber 26. The apertures or bores 31a in the capscrews function to permit escape of air which must be displaced from the cavity as the inertia element 18 is inserted therein.

With assembly having proceeded to the extent illustrated in FIG. 2, the capscrews 31 are removed and a measured quantity of viscous shear fluid is introduced into the chamber 26 through the apertures 22. Finally, the apertures 22 are plugged by the insertion of the closure members 23 (FIG. 3) therein.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of assembling a torsional vibration damper of the type which includes a disc adapted to be supported on a member subject to torsional vibration and having an annular cavity concentric with the center of the disc formed by radially spaced side walls joined by a base wall, annular elastic members at the spaced side walls of the cavity and an annular inertia element within the cavity between the elastic members, and a shear fluid in the space between the inertia element and the cavity base wall, said method of assembly comprising: inserting vented abutment members transversely through the inertia element at spaced points thereon with the abutment members protruding through the inertia element a predetermined amount; inserting said inertia member into the disc cavity to a depth determined by the bottoming of said abutment members on the cavity base wall; removing said abutment members from the inertia element and filling the space between the inertia element and the cavity base wall with a shear fluid through the apertures vacated by the abutment members; and finally inserting and sealing capscrews into the vacated apertures with the depth of insertion of the capscrews establishing the fluid pressure in said space.

2. A method of assembling a torsion vibration damper of the type which includes an element adapted to be supported on a member subject to torsional vibration and having an annular cavity formed by radially spaced side walls joined by a base wall, annular elastic members at the spaced side walls of the cavity and an annular inertia element within the cavity between the elastic members, and a shear fluid in the space between the inertia element and the cavity base wall, said method of assembly comprising: inserting vented abutment members transversely through the inertia element at spaced points thereon with the abutment members protruding through the inertia element a predetermined amount; inserting said inertia member into the disc cavity to a depth determined by the bottoming of said abutment members on the cavity base wall; removing said abutment members from the inertia element and filling the space between the inertia element and the cavity base wall with a shear fluid through the apertures vacated by the abutment members; and finally inserting and sealing closure means into the vacated apertures with the depth of insertion of the closure means establishing the fluid pressure in said space.

3. A method of assembling a torsional vibration damper of the type which includes a disc adapted to be supported on a member subject to torsion vibration and having an annular cavity concentric with the center of the disc formed by at least one side wall joined by a base wall, an annular elastic member adjacent the side wall of the cavity and an annular inertia element within the cavity in engagement with the elastic member, and shear fluid in the space between the inertia element and the cavity base wall, said method of assembly comprising: inserting vented abutment members transversely through the inertia element at spaced points thereon with the abutment members protruding through the inertia element a predetermined amount; inserting said inertia member into the disc cavity to a depth determined by the bottoming of said abutment members on the cavity base wall; removing said abutment members from the inertia element and filling the space between the inertia element and the cavity base wall with a shear fluid through the apertures vacated by the abutment members; and finally inserting sealing closure means into the vacated apertures with the depth of insertion of the closure means establishing the fluid pressure in said space.

References Cited by the Examiner

UNITED STATES PATENTS

| 2,093,092 | 9/37 | McElhany et al. | 29—421 |
| 2,404,515 | 7/46 | Meyer | 74—572 |
| 2,636,399 | 4/53 | O'Connor | 74—574 |

FOREIGN PATENTS

| 539,945 | 4/57 | Canada. |

WHITMORE A. WILITZ, *Primary Examiner.*

BROUGHTON DURHAM, *Examiner.*